Feb. 14, 1933.   S. LOEWE   1,897,204
MEANS FOR THE REMOTE READING OF INSTRUMENTS
Filed Feb. 26, 1927
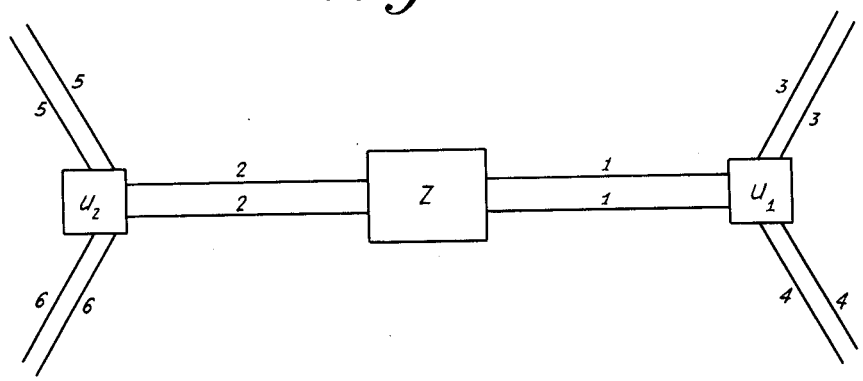
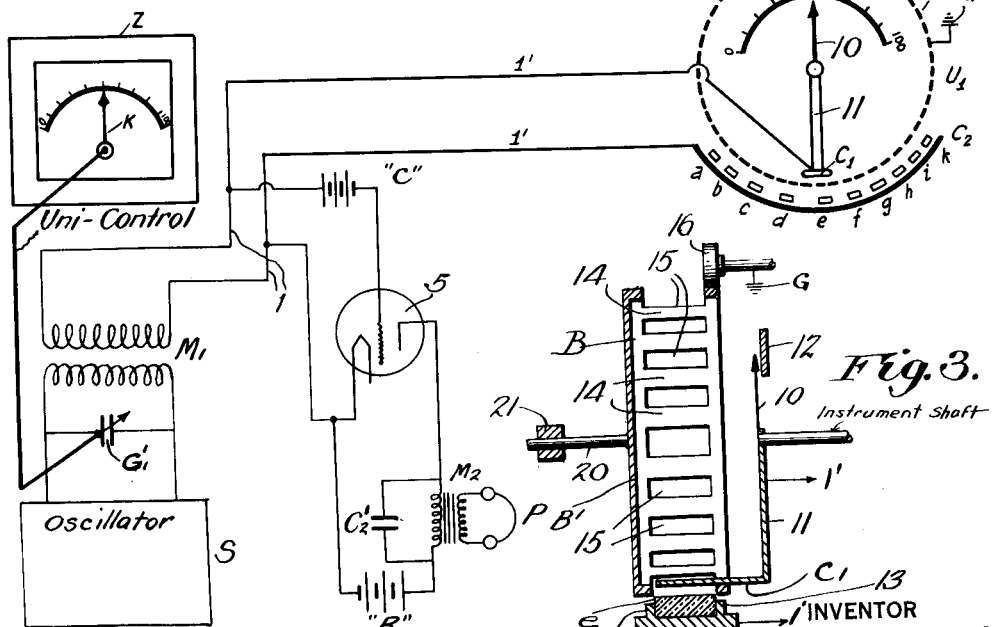

Patented Feb. 14, 1933

1,897,204

UNITED STATES PATENT OFFICE

SIEGMUND LOEWE, OF BERLIN, FRIEDENAU, GERMANY, ASSIGNOR TO RADIO CORPORATION OF AMERICA, A CORPORATION OF DELAWARE

MEANS FOR THE REMOTE READING OF INSTRUMENTS

Application filed February 26, 1927, Serial No. 171,359, and in Germany May 15, 1926.

The subject-matter of this invention relates to an arrangement for the reading at a distance (tele-indication) of measuring instruments and for similar purposes. The invention includes both the method underlying the scheme as well as the means used to carry it into effect. Both the problem and its solution will be hereinafter explained by the aid of an example.

In the neighborhood of long-distance central stations, at more or less great distances therefrom, there are usually substations in which, for example, transformers are mounted. It often happens that lines supplied from different centrals converge at such substations, and these lines frequently have a variable load. At the substation, measuring instruments are mounted which indicate the value of the load of the different lines and branches. It is necessary that the readings or indications of these measuring instruments should be known at the central power station in order that, in conformity with requirements, the output of the central may be either raised or diminished. It has heretofore been necessary, in order to do this, to keep meter readers at the substations, whose duty it was to impart the readings by telephone or telegraph to the central station.

The present invention has for its object ways and means to be hereinafter disclosed, for ascertaining the indications of the measuring instruments from the central itself, whereby the presence of an observer or meter reader at the substation is dispensed with.

Another object of this invention is to provide an arrangement whereby the remote instrument is to send oscillations at a frequency bearing a definite relation to its reading.

A further object of this invention is to provide piezo-electric crystals for generating such oscillations.

Still another object of this invention is to determine the reading of the remote instrument by beating the waves sent out from it with waves generated at a desired point.

A further object is to provide indicating means, when such beating occurs, to indicate the relative position of the indication on the remotely situated instrument.

In the accompanying drawing,
Figure 1 is a diagrammatic layout of a central station and a pair of substations,
Figure 2 diagrammatically shows apparatus built according to, and for the purpose of carrying out, the objects of my invention,
Figure 3 shows, in section, structural detail of the piezo-electric apparatus employed in the present invention.

Referring to Figure 1, Z is the central station which is connected by long-distance lines 1 and 2 with substations U1 and U2, respectively, other lines 3, 4, and 5, 6, respectively, leaving said substations and connecting with consumers' places or other centrals belonging to neighboring line systems. At U1 and U2 are mounted measuring instruments such as voltmeters which indicate the load conditions. The problem now is to provide ways and means adapted to ascertain the positions and readings of these measuring instruments from the central station Z. The method suited therefor and an arrangement adapted to carry the same into effect is shown by way of example in Figure 2.

Suppose that the scale of the measuring instrument is divided into ten divisions (from 0 to 100), and that the hand or pointer 10 of that instrument is located at 50. It is sufficient to know the position of the pointer to an accuracy of divisions of 10. In order to be able to determine the said position of the pointer at any given time from the central station, transmitter means sending out radio frequency oscillations are installed at the central station whose frequency is variable within definite limits.

The radio frequency oscillations generated at the central station, in a manner well known from wire-guided radio frequency telegraphy or telephony, are sent over lines 1 and 2 to substations U1 and U2, respectively. At the substations are piezo-electric quartz resonators of different periods, the number of said resonators equalling the number of pointer positions or readings to be transmitted. On the basis of the assumption above made, 10 such resonators would be required for 100 scale divisions. Of course, it will be understood that this number can be increased or diminished at will.

The quartz resonators corresponding to the different pointer positions and tuned to different frequencies are indicated in Figure 2 by reference letters $a, b, c, d, e, f, g, h, i, k$. Relations may now be established between the pointer position of reading and the particular quartz resonator that happens to be in circuit. This is shown in Figure 2. The pointer has a downwardly directed extension 11, and in addition a condenser coat C1, the coacting second coat being, if desired, common to all of the quartz resonators, the latter coat being designed by C2. As shown in Figs. 2 and 3, each crystal is mounted on the arcuate coat or plate $C_2$ and held in place by the four flanges 13, Fig. 3 only showing two of the flanges associated with crystal $e$, it being understood that the other two flanges 13 associated with crystal $e$ are disposed at right angles to the flanges shown in section in Fig. 3. This structure is the same for each crystal, it being further observed that this crystal mounting structure is well known to those skilled in the art. Now, as the pointer slides over the scale 12, the different quartz resonators $a$ to $k$ are consecutively inserted between the capacity coats C1 and C2. From the conductors 1 by way of which the variable radio frequency current generated at central station Z is directly conducted, there are branched off the lines 1' which substantially convey the radio frequency current sent out from the central to the coats C1, C2, the usual precautions having to be adopted in making the branch-off.

In Figure 2, the radio frequency transmitter S mounted at the central is indicated on the left-hand side. The frequency of this transmitter is variable. The oscillator or transmitter S produces oscillations the frequency of which can be varied at will by lengthening the position of the variable condenser $C'_1$, it being noted that the oscillator S is coupled to the line 1, 1' by a coupling $M_1$. Suppose that the regulation takes place by the aid of a controller arm or lever K mechanically coupled to the rotor of the variable condenser $C'_1$, which is moved over a scale also divided into 100 parts. The mechanical coupling between the variable condenser $C'_1$ and the lever K is denoted by a full line between the two elements, and is designated on the drawing by the term "uni-control". By turning the lever K from 0 to 100, the transmitter frequency may be varied within definite limits, and a radio frequency current of correspondingly varying frequency is sent over or along the conductors 1 and 1', respectively.

The quartz crystals $a$ to $k$ have resonance frequencies differing from one another by definite amounts. For instance, the crystal $a$ shall be supposed to have a natural frequency corresponding to a wave-length of 2000 meters, while the natural wave of crystal $k$ shall be supposed to be 2090 meters. The intermediate crystals $b$ to $i$ have natural waves graduated inside said limits, for instance, in such a manner that the difference between the natural waves is 10 meters for each interval. Hence, the crystal $a$ will always be excited to oscillate in resonance, when the transmitter S of station Z is adjusted exactly at 2000 meters, crystal $b$ at 2010, crystal $c$ at 2020, and so on.

It is not necessary that these steps or intervals should be equal, or that they should just have definite values. However, it is a suitable plan to dispose the crystals in such a way that their natural period either grows or decreases from one crystal to the next as the pointed 10 passes from minimum to maximum values. Hence, the crystals may just as well be given irregular intervals and irregularly increasing natural waves, for instance, crystal $b$ may have a natural wave of 2005 meters, crystal $c$ 2025, crystal $d$ 2028, and so on.

At the position of the pointer 10 shown in Figure 2 on scale division 50, for instance, quartz crystal $e$ is located between the coats C1 and C2. Suppose that this crystal has a natural wave of 2040 meters. If the transmitter, on turning crank or lever K between 0 and 100 degrees covers the whole range between wave-length 2000 and 2090 meters, then at a definite position of lever arm K, for instance, in the position shown in Figure 2, the wave produced will be 2040 meters, so that crystal $e$ will be caused to start resonance oscillations.

It is, therefore, necessary on the one hand to indicate that a certain crystal has responded, and in addition to that ways and means must be provided to indicate that this particular resonator $e$ has responded. At the transmitter station it is comparatively simple to learn that a crystal has responded. When a crystal is caused to oscillate at its own period, it acts like a small transmitter for its natural wave. This fact is reported back by way of lines 1' and 1 to the central, and there produces in well known manner a beat with the transmitted wave varying with the rotation of the arm. If the transmitted wave, in the position of lever K here assumed, is exactly equal to 2040 meters, then the crystal $e$ which happens to be in circuit because the pointer occupies a corresponding position, will be caused to start resonance oscillations. If the lever K is moved to and fro a little, beats will be produced between this variable wave and the crystal wave as conditions approach and move away from resonance with the quartz crystal. These beats can be made perceptible in a sensitive receiving apparatus at the sending station in the form of a loud sound.

If the scale over which the lever arm K moves is calibrated to read in wave-lengths, then, in the assumed position of the pointer, this sound will be audible at the transmitter station only when the lever arm K is very close to the wave-length of 2040 meters, or is moved about this position inside a small range. It is thus known at the transmitter station that the quartz crystal has been excited whose natural period is 2040 meters, in other words, as above assumed, the crystal $e$.

The audible beat between the crystal wave and the variable transmitter wave is detected in some utilization means, as phones P or a loud speaker, at the central station Z. The phones are connected across the secondary of an audio transformer $M_2$, the primary of which is connected in the plate circuit of a triode 5. The plate is energized by a source "B", the primary coil having a by-pass condenser $C'_2$ shunted across it. The grid of the triode 5 is negatively biased to constitute the tube a detector in its action, and the terminals of its input circuit of triode 5 are connected across the line 1, 1. Thus, the piezo-electric oscillations of crystal $e$, as shown in Figure 2, becomes audible in phone P, when the lever K is moved to and fro over the point on its scale corresponding to position 50 at $U_1$. That is to say, what is really heard is the beats produced by the heterodyning of the variable transmitter oscillation and the varying piezo-electric oscillations, it being understood that no beats are heard when the lever K is, for example, at a position corresponding exactly to the positon 50 at $U_1$, and the $U_1$ pointer is at 50.

Since it is known at the transmitting station that crystal $e$ is coordinated to the position 50 of the meter hand, it is thus also known at the sending station that the pointer of the measuring instrument at the substation U1 occupies the position corresponding to division 50.

If the pointer moves over to the scale division 100, the crystal $a$ will be caused to be located between coats C1 and C2. The sound previously audible at 2040 meters will then no longer arise since the crystal has a natural wave of 2000 meters. Hence, the lever K will have to be adjusted, and a sound will be audible just when the transmitter is set to a wave-length of 2000 meters, or is varied about this value inside small limits. If the sound is observed at the sending station S in the neighborhood of wave-length 2000 meters, then it is known that the pointer is located at scale division 100, since it is only then that the crystal $a$ is in circuit whose natural period is 2000 meters.

To simplify operations, the zero point of the scale at the sending station is brought to agree with the natural period of crystal $k$. If the latter, e. g., has a wave-length of 2090 meters, then the transmitted wave varied by the crank K is suitably adjusted so that the transmitter will generate a wave of exactly 2090 meters just when the lever arm K is in the zero position. Care should be taken so that, when the lever arm K is in the 100 position, there will be produced a wave-length corresponding to the crystal $a$, i. e., of 2000 meters.

This adjustment of the transmitter scale may be easily accomplished by the aid of quartz crystals. For this purpose, there are used two crystals, one of which is tuned to 2000, and the other one to 2090 meters. By the lever arm K, one of the tuning elements of the transmitter is operated, for instance, a rotary condenser. Next the transmitter is so adjusted by the aid of a variable additional condenser or self-inductance coil that its wave-length, with lever arm K in the zero position, amounts to exactly 2090 meters, a fact that can be readily checked by the aid of a quartz crystal combined with the transmitter, for instance, in well known manner by luminescence of the quartz crystal mounted inside a rarefied gas space.

Similarly, care should be taken so that in the 100 degrees position of the lever arm K there is just produced a wave of 2000 meters. If the crystals $a$ to $k$ differ from one another at regular intervals as to frequency, the corresponding wave-lengths will have to be distributed at uniform intervals over the scale of the transmitter K. Measurement of the wave-length is then no longer necessary. Indeed, the very position of the lever arm K on the transmitter scale itself will show what position the pointer of the measuring instrument mounted at the substation has. If the pointer happens to occupy an intermediate position, then two neighboring crystals will be caused to become excited and oscillate. Hence, the sound will be heard in two positions of the lever arm K, and this will show that the pointer is positioned between the corresponding scale divisions.

In a similar manner, the pointer position can be ascertained at the substation U2. All that is necessary with this end in view is to provide an arrangement of the kind shown in Figure 2 for substation U1 also at substation U2, and to send the transmitter waves generated at central station Z not over lines 1, 1' but to route them over lines 2. According to the particular position of the measuring instrument at this place, the sound will again become perceptible on the scale of the lever arm K. In this manner, any desired number of substations can be kept under observation.

According to the disclosure of the present invention, a special method for remote reading (tele-indication) is here involved in so for as at the central station only a single transmitter is provided, while at the substations only resonators are provided. Fundamentally speaking, also the inverse procedure could be followed, that is to say, the transmitter could be mounted at the substations, and resonators at the central. This scheme would require as many transmitters as there are substations, but this would mean a substantially higher cost and greater complication.

However, if the scheme illustrated in the drawing is applied, only a central transmitter is required, while the comparatively inexpensive resonators, which require no attendance and manipulation, may be mounted in any desired number at the substations. Looked at from a physical view point, the particular feature of the method resides in that, as it were, a reflected wave is returned from the substation to the central sation.

One peculiarity of the said acoustic phenomenon is that the same will occur only when a slight variation of the transmitter wave is produced, while it fails to arise whenever the transmitter wave is kept constantly at the resonance frequency of one of the quartz crystals. Now, this difficulty can be obviated in the following manner: Piezo-electric crystals can be caused to oscillate at their natural period by mechanical percussions or by electrical stimulation with fields of any desired frequency, excepting purely sinuously varying fields. For instance, if the condenser coat C2 is continuously shocked mechanically, then, at the same rhythm, wave-trains of all such frequencies will be produced as are possessed by the crystals in the form of their natural periods. However, there will be transmitted to the line 1, 1′, only that electrical wave produced in a way as hereinbefore stated as originates from the quartz crystal that just happened to be located between coats C1 and C2, in other words, in the case of Figure 2, only the natural period of crystal e.

In this case, only a feeble transmitter will be required at station Z (an ordinary back-coupled receiver will be sufficient), which contains but a small amount of energy in its oscillations, and which must be calibrated in a similar manner as described in connection with the transmitter S. In the telephone of this receiver or in a loud-speaker, on turning the tuning means K of the receiver, there will then be heard a constant interference phenomenon, when operating in the neighborhood of the resonance point with the frequency sent out by the crystal e. To be sure, when the oscillating receiver happens to be exactly in tune with the crystal e which in this case is sending out oscillations, no audible sound will be heard seeing that in the presence of the beat minimum, inaudibly slow beat tones are produced. But the phenomenon is clearly observable after the resonance point has been exceeded. If instead of a headset or telephone to observe the beat phenomenon, a measuring instrument is used, the latter, to be sure, also at the very resonance point will indicate an action, indeed, the latter will then have a maximum value. In this manner, the indication can be easily developed so as to be used for objective indication of the resonance point or position.

When recourse is had to the sound perceptible in a telephone receiver or the like, it is also quite easy to obtain indication of the resonance point itself. Under resonance condition, the crystal that happens to be in circuit is caused to oscillate constantly, and it returns a wave equalling the exciting wave by way of the line wires back to the central. The telephone receiver at transmitter point Z does not respond thereto seeing that in the presence of similarity of frequency, only integration of amplitudes is produced, integration resulting in constant decrease or increase of the incoming current in the telephone, but no periodically occurring intensity variations as required for the production of interference or beat sounds. However, if the quartz crystal in some manner or another, by excitation exactly at resonance frequency, is periodically caused to approach resonance and become removed therefrom, then a note will be produced in the telephone receiver which corresponds to this period.

For instance, as shown in detail in Fig. 3, if a rotating drum B which is grounded, as at G, is employed, having about its circumference screening segments 14 and interspaces 15 alternating with one another, then the field between C1 and C2, also in the case of resonance, will not act continuously upon the crystals, but rather in an intermittent manner, according to the number of metallic segments and interruptions in said revolving drum B and its speed of rotation. The drum B has one closed face B′, shown in section in Fig. 3, the opposite face (adjacent the needle 10) being open. The drum is supported by means of a shaft 20. One end of the shaft is rigidly affixed to the center of the face B′, while the other end of the shaft is rotatably disposed in a fixed bearing 21. The drum is driven by means of a metallic friction roller 16, the shaft of which roller is grounded at G. The roller is in driving contact with the peripheral edge of the drum adjacent the open face. For example, if the drum B has 50 segments, and if it rotates at a speed of 10 revolutions per second, excitation of crystal e will always occur whenever a slot 16 in the revolving drum happens to pass, while the excitation will be interrupted whenever a grounded screening segment 14 rotates past the same. In this case, exactly at the resonance point, the note corresponding to 500 vibrations will be heard the strongest. In this manner, the scheme of tele-reading of measuring instruments is carried into practice in a useful form.

It goes without saying that the arrangement in Figure 2 is only diagrammatic and by way of example. For instance, coat C2 need not carry all of the quartz resonators, indeed, both coats C1 and C2, which need not to be of greater width than is required by the size of the different quartz resonators, may be secured on the pointer in an insulated manner, as otherwise, by the action of stray fields, it may easily happen that several resonators may be excited.

As to the rest, it may be noted that the basic principle as illustrated in Figure 2 of intermittent excitation of quartz crystals for the purpose of making observable and perceptible the arising of piezo-electric resonance also in the resonance point, is useful not only for the special purpose hereinbefore described, but also quite generally for radio receiving and measuring work. It is evident that intermittent excitation need not take place in the manner as here described, on the contrary, special exciting electrodes of well known design may be provided on the quartz crystals, and these may be periodically short-circuited and opened.

I claim as my invention:

1. A tele-metering method which consists in producing oscillations at a central point, impressing said oscillations upon a series of piezo-electric sources at a remote indicating point to excite one or more of said sources into oscillation, each of said sources corresponding to a predetermined indication and being resonant to a predetermined oscillation frequency, varying the frequency of said central oscillation within a predetermined range of frequencies, impressing resulting piezo-electric oscillations upon the source of oscillations at said central point to obtain beats between piezo-electric oscillations of a desired frequency and the exciting central oscillations and detecting the beats at said central station.

2. A method of reading indications at a remote station from a central station distant from said remote station which consists in producing oscillations at the central station, transmitting said oscillations along a conductive path between the central and remote stations, impressing said oscillations at said remote station upon a piezo-electric source resonant to a predetermined oscillation frequency to excite said source into oscillation, transmitting the resulting piezo-electric oscillations along said conductive path to said central station, intermittently interrupting the excitation of said piezo-electric source to obtain beats between said piezo-electric oscillations and the exciting central oscillations and detecting the beats at said central station.

3. In an arrangement for reading remotely situated indicating apparatus piezo-electric means at said remote apparatus to generate electrical oscillations at a frequency determined by the indicator of the indication apparatus, means at a central point distant from the remote apparatus for generating oscillations of different frequencies to excite said piezo-electric means into oscillation, and means at said central point responsive to beats caused by the combining of the exciting and piezo-electric oscillations.

4. In an arrangement for ascertaining indications of a remote indicating apparatus a plurality of piezo-electric crystals arranged in a predetermined series the said remote apparatus to generate electrical oscillations at a frequency determined by the indicator of the indication apparatus, means at a central point distant from the remote apparatus for generating oscillations of different frequencies to excite said piezo-electric crystals into oscillation, and means at said central point responsive to beats caused by the combining of the exciting and piezo-electric oscillations.

5. In an arrangement for determining the remote indication of an instrument, means at a central recording station to generate electrical oscillations at various frequencies, piezo-electric means at a station remote from the central station and responsive to said central oscillations to generate oscillations at the indicating instrument at a frequency dependent upon the position of the pointer of said instrument, means at the central station combining said remote and central oscillations to produce beats, and indicating means responsive to the beats.

6. In an arrangement for determining from a central station the reading of an instrument at a substation, means for generating oscillations at the central station, piezo-electric means excited by the central oscillations for generating oscillations at the substation of varying frequency dependent upon the position of the indicator of the instrument to be read at the substation, means for conveying the oscillations generated by the piezo-electric means at the substation, comprising the power lines between the substation and the central station, to the central station, means at the central station for heterodyning the central and piezo-electric oscillations, and means at said central station for detecting the resulting beats.

7. In an arrangement for determining from a central point indications of an instrument at a remote point, means for generating oscillations at the central point, means at the central point for simultaneously determining and indicating the frequency of the oscillations generated at the central point, a plurality of piezo-electric crystals excited by the central oscillations for generating oscillations at the remote point of varying frequency in accordance with the position of the indicator of the instrument desired to be read at the remote point, means for transmitting the oscillations generated at the remote point to the central point, means at said central point for combining the central and remote oscillations, and means for detecting the combined oscillations.

8. In an arrangement for determining from a central point indications of an indicating device at a remote point, an oscillation generator at the central point, means for determining the frequency of the oscillations generated at the central point, means for transmitting the central oscillations to the remote point, means at the remote point associated with the indicator of the indicating instrument adapted to be excited by the central oscillations at a frequency in accordance with the position of the said indicator, said oscillations generated at the remote point being transmitted back to the central point over said transmission means, means at the central point to combine the central and remote oscillations, and means for detecting the combined oscillations.

9. In an arrangement for determining from a central station the reading of an instrument at a substation, means for generating oscillations at the central station, a plurality of piezo-electric crystals at the substation, means for transmitting the central oscillations to the substation, said crystals being selectively responsive to said central oscillations for generating oscillations at the substation at a frequency in accordance with the position of the indicator of the instrument desired to be read at the substation, said oscillations generated at the substation being transmitted back to the central station over the aforementioned transmission means, means for heterodyning the central and substation oscillations at the central station, means for detecting the resulting beats, and means for intermittently interrupting the excitation of the crystals at the substation.

10. In combination, a variable element, piezo-electric means at said element to generate electric oscillations of a frequency determined by adjusted positions of the element, means at a point remote from the element to obtain indications corresponding to adjusted positions of the variable element, said remote means including a device for exciting said piezo-electric means into oscillation at said adjusted positions of said element, and means responsive to said piezo-electric oscillations.

11. In combination, a variable element, piezo-electric means electrically associated with said element to generate electric oscillations of a frequency determined by adjusted positions of the element, means at a point remote from the element to obtain indications corresponding to adjusted positions of the variable element, said remote means including a device for exciting said piezo-electric means into oscillation at said adjusted positions of said element, and means audibly responsive to said piezo-electric oscillations.

12. In combination, a variable element, piezo-electric means electrically associated with said element to generate electric oscillations of a frequency determined by adjusted positions of the element, means at a point remote from the element to obtain indications corresponding to adjusted positions of the variable element, said remote means including an oscillator device for exciting said piezo-electric means into oscillation at said adjusted positions of said element, and means responsive to said piezo-electric oscillations.

13. In combination, a control station, a remote variable element, piezo-electric means, electrically associated with the remote element, for generating oscillations whose frequencies depend on adjusted positions of said element, means at the control station to excite said piezo-electric means at said adjusted positions, and means at the control station responsive to said oscillations to indicate the said adjusted positions of the remote element.

SIEGMUND LOEWE.

CERTIFICATE OF CORRECTION.

Patent No. 1,897,204.  February 14, 1933.

SIEGMUND LOEWE.

It is hereby certified that error appears in the printed specification of the above numbered patent requiring correction as follows: Page 1, line 82, strike out the word "said" and insert the same before "pointer" in line 83; page 3, line 129, for "for" read "far"; page 4, line 19, for "sation" read "station"; and line 124, for "16" read "15"; page 5, lines 45 and 46, claim 1, strike out the words "at said central station"; and that the said Letters Patent should be read with these corrections therein that the same may conform to the record of the case in the Patent Office.

Signed and sealed this 25th day of July, A. D. 1933.

M. J. Moore.

(Seal)  Acting Commissioner of Patents.